United States Patent
Austin et al.

(10) Patent No.: US 7,299,019 B1
(45) Date of Patent: Nov. 20, 2007

(54) CELLULAR HANDOFF BASED ON TRAFFIC LOAD SHARING

(75) Inventors: Mark D. Austin, Atlanta, GA (US); Ali Jabarry, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 698 days.

(21) Appl. No.: 09/822,316

(22) Filed: Apr. 2, 2001

(51) Int. Cl.
*H04B 1/18* (2006.01)
*H04Q 7/20* (2006.01)

(52) U.S. Cl. .......... 455/161.3; 455/436; 455/439; 455/453

(58) Field of Classification Search ........ 455/67.11, 455/439, 453, 436, 161.3
See application file for complete search history.

(56) References Cited

U.S. PATENT DOCUMENTS

| | | | |
|---|---|---|---|
| 5,175,867 A * | 12/1992 | Wejke et al. | 455/439 |
| 5,241,685 A * | 8/1993 | Bodin et al. | 455/453 |
| 5,594,943 A * | 1/1997 | Balachandran | 455/436 |
| 5,822,686 A * | 10/1998 | Lundberg et al. | 455/161.3 |
| 6,266,531 B1 * | 7/2001 | Zadeh et al. | 455/453 |
| 2002/0086679 A1 * | 7/2002 | Li et al. | 455/453 |

* cited by examiner

*Primary Examiner*—William D. Cumming
(74) *Attorney, Agent, or Firm*—Cantor Colburn LLP

(57) ABSTRACT

A method of effecting a handoff in a cellular network. The method includes monitoring a set of frequencies listed in a mobile assisted handoff (MAHO) list for their respective signal strengths, each of the frequencies being associated with neighbor cell site, logically ordering the frequencies based on their relative signal strengths, identifying in the logically ordered set of frequencies those frequencies having a signal strength higher than a predetermined threshold, determining a level of traffic at each frequency/cell site associated with the set of frequencies, and selecting a cell site for handoff based at least in part on signal strength and in part on the level of traffic at the neighbor cell site.

10 Claims, 4 Drawing Sheets

| Freq. | Sig Strength (dB) | Traffic | Known Pattern | |
|---|---|---|---|---|
| F3 | -30 | FULL | | |
| F1 | -38 | MED | | |
| F4 | -41 | LOW | 5:00< Low< 6:10 | |
| F2 | -50 | ACTIVE | 5:00< High< 6:30 | 40 |
| F5 | -63 | HIGH | | |
| F7 | -72 | LOW | | |
| F6 | -78 | FULL | | |
| | | | | |

FIGURE 4

CELLULAR HANDOFF BASED ON TRAFFIC LOAD SHARING

BACKGROUND

1. Field of the Invention

The present invention is directed to cellular telephone system call management. More particularly, the present invention is directed to a system and method for assigning about-to-be-handed off cellular calls to a neighbor cell site based on a criteria such as traffic load at the time of handoff.

2. Background of the Invention

FIG. 1 depicts a typical cellular telephone system in which a plurality of cellular antenna cell sites 100a, 100b, 100c are each capable of servicing a mobile telephone or other wireless devices such as a personal digital assistant (PDA) or interactive pager (hereinafter, collectively, "mobile device" 115). As mobile device 115 travels from one location to another it is necessary to hand off, from one cell site to another, the communication that is occurring between mobile device 115 and another party or entity. That is, as mobile 115 device travels, the signal to and from an "active" cell site, i.e., the cell site that is currently servicing the mobile device, will eventually fade, making it necessary to hand the communication off to another cell site whose signal strength at the mobile device's then-current location is greatest among a group of preselected cell sites. To accomplish this task a mobile switching center (MSC) 120 is provided to, among other things, assign the cell site to be handed off to based on feedback from mobile device 115. More specifically, MSC 120 determines which neighbor cell site has the greatest signal strength to the mobile device, thereby identifying the neighbor to hand off to.

FIG. 2 is a flow chart of a conventional mobile device handoff procedure. At step 201 mobile device 115 registers with a cellular network when, e.g., it is first powered up. Upon registration with the cellular network (i.e., the collection of cell sites 100a, 100b, 100c, MSC 120, etc.), MSC 120 generates a list of likely handoff cell site candidates, often called "neighbors." The generated list is called the mobile assisted handoff (MAHO) list and includes a list of frequencies to which the mobile device should tune periodically to record the then-available signal strength. Typically, the MAHO list lists the digital control channel (DCCH) frequency of the likely hand off candidates, in accordance with the well-known IS-136 cellular communications specification. However, any time slot of a channel could be used to assess the signal strength from a particular cell site 100. At step 203, the generated MAHO list is passed back to the active cell site, which then passes the MAHO list to mobile device 115. At step 205, mobile device 115 monitors the signal strength of each of the frequencies in the MAHO list and then at step 207, mobile device 115 sends back to the active cell site and, ultimately, to MSC 120, at least a subset of the monitored signal strengths.

At step 209, MSC 120 evaluates the signal strengths that have been returned by mobile device 115 and orders or arranges them (logically) by signal strength, or at least identifies the cell site having the strongest signal strength among the group of MAHO-listed cell sites. Meanwhile, although not depicted in the flow chart, mobile device 115 is also continuously monitoring the signal strength of the cell site that is servicing mobile device 115. This information is also communicated back to MSC 120, as is well known in the art. Accordingly, at step 211, it is possible for MSC 120 to determine whether a neighboring cell site has a signal strength that is stronger than the servicing cell site.

If the servicing cell site still has the strongest signal strength among those listed in the MAHO list, or the signal strength of the servicing cell site has not dropped below a predefined threshold, then mobile device 115 is deemed not to be ready for hand off and the process loops back to step 205. Under typical circumstances, MSC 120 is updated with signal strength information about once per second.

If, on the other hand, either the signal strength of one of the cell sites in the MAHO list is stronger than the active cell site or the signal strength of the active cell site has fallen below the predefined threshold, at step 213 MSC 120 determines if at the cell site identified in step 209 there is a channel available to receive a handoff. If, at step 215, a channel is available, handoff is executed at step 217 and a new MAHO list is provided to the mobile device at step 203.

If, at step 215, a channel is not available at the cell site identified in step 209 (i.e., all channels are being used on that cell site), MSC 120 checks the next entry in the ordered MAHO list, i.e., for the cell site having the next strongest signal strength, step 219. If, at step 221, there is no further cell site in the MAHO list or none of the those cell sites has a signal strength above the threshold, then at step 223 the call or radio link is dropped from the network altogether. If at step 221 there is another cell site to evaluate in the MAHO list, then the process returns to step 215 to evaluate that next cell site.

Thus, in accordance with the prior art methodology of handing off mobile device calls, the MSC is programmed to identify the neighbor cell site having the strongest available signal strength. However, this methodology can lead to an undesirable "pile-up" on selected cell sites, especially those cell sites that service areas of high congestion, e.g., during a rush hour period.

SUMMARY OF THE INVENTION

The present invention overcomes the deficiencies of the prior art methodology of controlling cellular handoff operations, by, instead of basing handoff decisions solely on signal strength, cell site handoff selection is based on load sharing or traffic sharing as well as signal strength. More specifically, in the present invention the MSC preferably evaluates candidate cell sites in the MAHO list not only with respect to greatest signal strength, but also with respect to which cell sites in the MAHO list are above the threshold signal strength to support communication with the mobile device in question. Then the MSC preferably also determines which of those cell sites is currently servicing the least amount of traffic and/or is most likely to be in the path of the mobile device as it travels through the cell site network and/or is expected to enter a low traffic period. Thus, in accordance with the present invention it is possible to more evenly distribute the cellular traffic among the available resources within the cellular network. It is also possible, in accordance with the principles of the present invention, to improve the efficiency of the operations of the MSC in that the MSC no longer needs to iterate through each entry in the MAHO list in order to identify and select a cell site eligible for handoff.

It is therefore an object of the present invention to provide an improved method of selecting a cell site for handoff.

It is yet another object of the present invention to provide a method of selecting a cell site for handoff based on criteria other than only which cell site has the strongest signal strength.

It is another object of the present invention to provide a method of effecting handoff by determining which neighbor candidate cell sites are carrying less traffic than other eligible neighbor candidate cell sites.

It is also an object of the present invention to provide a method of effecting handoff based on the likely route of a mobile device.

It is another object of the present invention to provide a method of effecting handoff based on the time of the handoff and known load patterns.

These and other objects of the present invention will become apparent upon a reading of the following detailed description in conjunction with the accompanying drawings.

BRIEF DESCRIPTION OF THE DRAWINGS

FIG. 4 depicts a table including a MAHO list that is generated and acted upon by an MSC in accordance with the present invention.

DETAILED DESCRIPTION OF THE INVENTION

Figure 1:
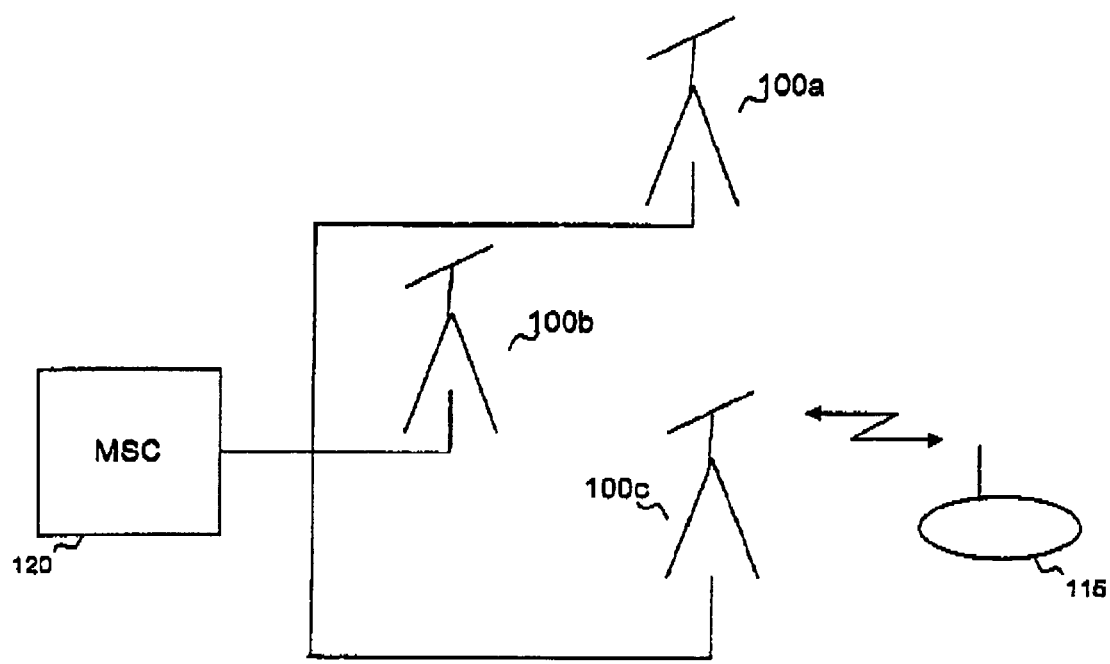
FIG. 1 is a schematic diagram of a cellular system including a mobile switching center and mobile device.
Figure 2:
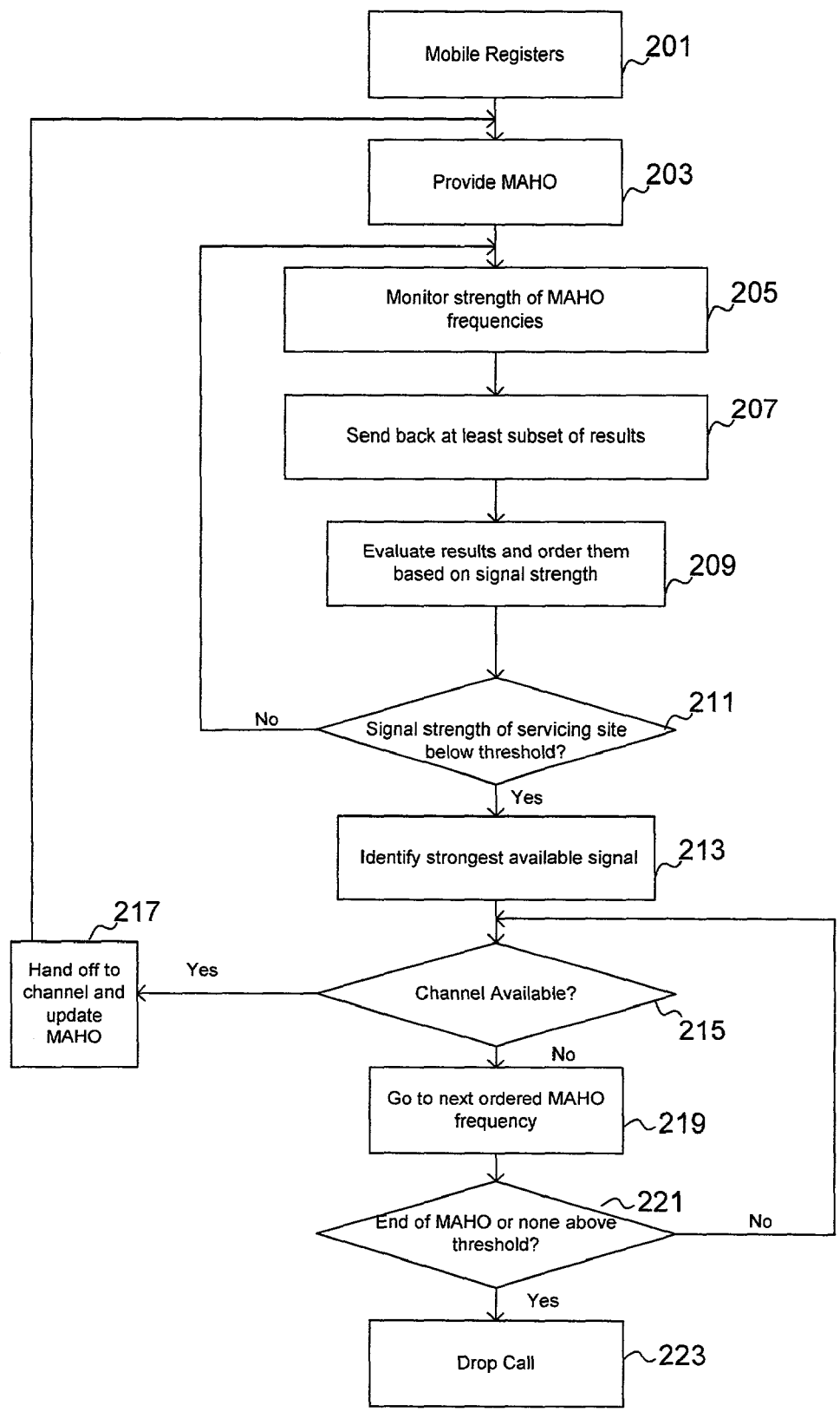
FIG. 2 is a flow chart illustrating a prior art method of performing a handoff procedure in a cellular system.
Figure 3:
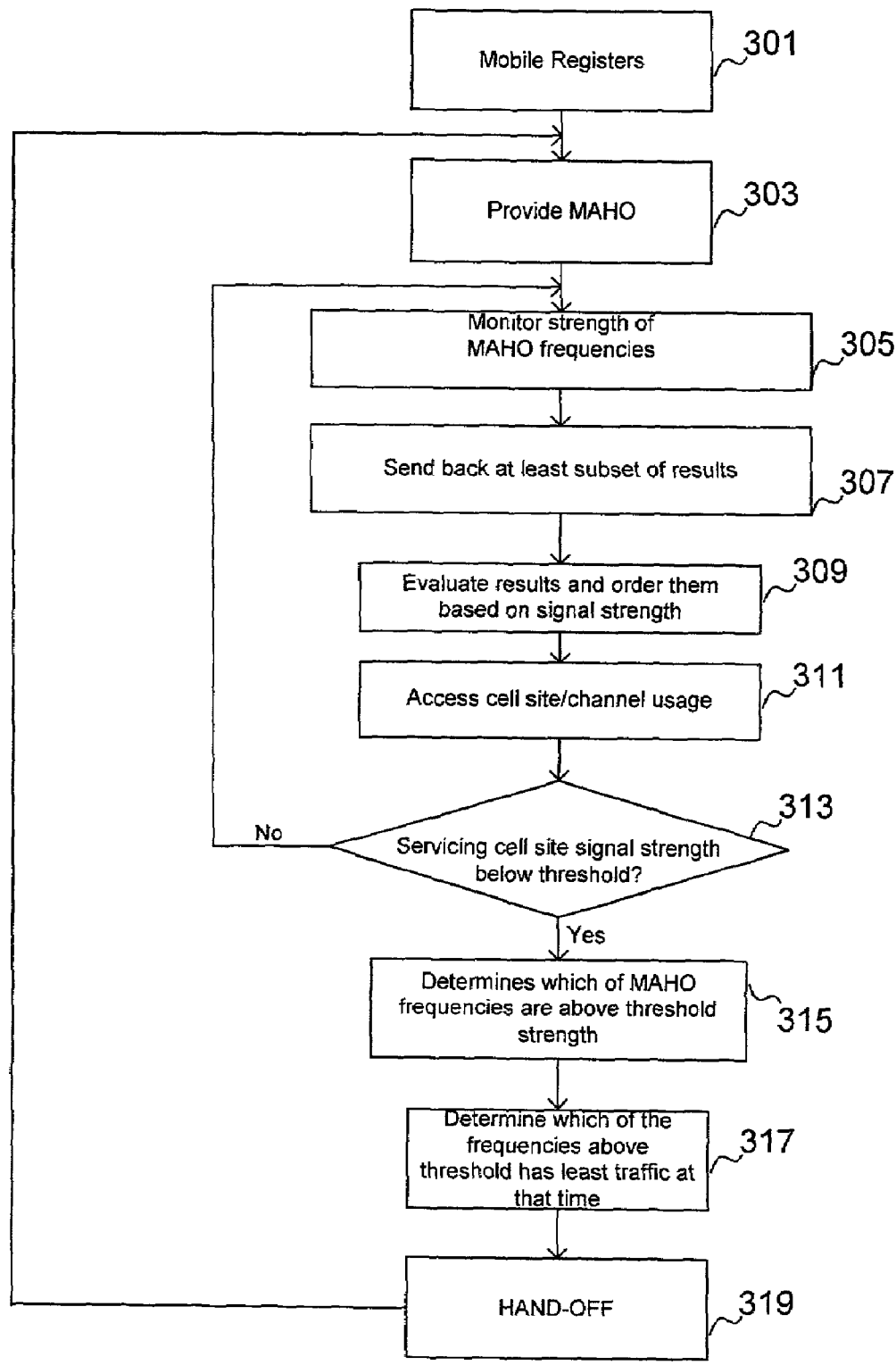
FIG. 3 is a flow chart of a preferred method for implementing the principles of the present invention.

FIG. 3 illustrates an exemplary method of practicing the principles of the present invention in which criteria other than only signal strength are used to identify neighbor cell site handoff candidates. That is, instead of basing a handoff decision solely on greatest signal strength, as is the practice in the prior art, selection of a cell site for handoff in accordance with the present invention is preferably also based on data representative of load sharing or traffic sharing. In the preferred embodiment of the present invention, MSC 120 preferably evaluates the signal strengths of the cell sites in the MAHO list not only with respect to which ones are higher than the others, but also with respect to which of the cell sites in the MAHO list are above a minimum threshold to support communication with the mobile device in question. The MSC then preferably also determines which of those cell sites is currently servicing the least amount of traffic and/or is most likely to be in the path of the mobile device as it travels through the cell site network. Thus, the present invention provides for more evenly distributed cellular traffic among the available resources within a given cellular network. It is also possible, in accordance with the principles of the present invention, to improve the efficiency of the operations of the MSC in that the MSC no longer needs, necessarily, to iterate through each entry in the MAHO list in order to identify and select a cell site eligible for handoff.

Referring now to FIG. 3, at step 301 mobile device 115 registers with a cellular network, e.g., when it is first powered up. After mobile device 115 registers with the cellular network (i.e., the collection of cell sites 100a, 100b, 100c, MSC 120, etc.), MSC 120 generates a list of likely handoff cell site candidates, often called "neighbors." As in the prior art, this list is called the mobile assisted handoff (MAHO) list and includes a list of frequencies to which the mobile device should tune periodically to record the-then available signal strength. Typically, the MAHO list lists the digital control channel (DCCH) frequency of the likely hand off candidates, in accordance with the well-known IS-136 specification. However, any time slot of a channel (frequency) could be used to assess the signal strength from a particular cell site 100. At step 303, the generated MAHO list is passed back to the active cell site, which then passes the MAHO list to mobile device 115. At step 305, mobile device 115 monitors the signal strength of each of the frequencies in the MAHO list and then at step 307, mobile device 115 sends back to the active cell site and, ultimately, MSC 120, at least a subset of the monitored signal strengths.

At step 309, MSC 120 evaluates the signal strengths that have been returned by mobile device 115 and orders or arranges them (logically) by signal strength. FIG. 4 shows a MAHO list table that can be acted upon by MSC 120 in accordance with the present invention. FIG. 4 also shows a threshold signal strength level (reference numeral 40) above a communications link between a cellular site and a mobile device can be readily maintained. The frequencies (F1, F2, F3, etc.) above threshold 40 are therefore all candidates for receiving a handoff from the active cell site. Although not depicted in the flow chart of FIG. 3, mobile device 115 is also continuously monitoring the signal strength of the cell site that is servicing mobile device 115. This information is also communicated back to MSC 120.

At step 311, MSC 120 obtains, by accessing, e.g., its internal databases and/or switching infrastructure information, channel usage data for each of the frequencies that is deemed to have a signal strength greater than threshold 40. FIG. 4 shows a column labeled "traffic." This column is preferably filled in based on the channel usage data just obtained and is preferably continuously updated. In the Figure, the labels of "full" (i.e., no capacity remaining), "high," "medium" and "low" traffic are used to denote the level of traffic at the particular cell site and frequency listed in the MAHO list. Of course, any label or even the actual number of channels being used could be employed as entries in the table of FIG. 4. Although the active cell site is not technically part of the MAHO list, for purposes of illustration the active cell site/frequency is listed and the label "active" is used to denote that frequency.

At step 313 MSC 120 determines whether the signal strength of the servicing cell site for mobile device 115 has dropped below the predefined threshold or is sufficiently close to that threshold. If not, the process loops back to step 305. If, on the other hand, the signal strength of the active cell site has fallen below the predefined threshold 40, MSC 120, at step 315, determines which of the MAHO-listed frequencies are above threshold 40. Then at step 317, it is determined which of the frequencies above threshold 40 have the least amount of traffic. Handoff is then preferably executed, at step 319, with the cell site (frequency) that has a "low" or "medium" traffic load, thereby distributing the mobile traffic to cell sites with the most capacity at a given time. The process then returns to step 303 wherein mobile device 115 receives an updated MAHO list based on the location of the new active cell site.

A more concrete example of the principles of the present invention is explained with reference to FIG. 4. As shown, frequency F2, the active cell site, is at (or at least close to) threshold 40 and is thus ready for handoff. In accordance with prior art handoff methodology, the cell site associated with frequency F1 would be selected for handoff since it has the highest signal strength of available neighbor cell sites. However, the cell site associated with frequency F4 has a signal strength that is above threshold 40, and moreover, has relatively more capacity than the cell site associated with frequency F1. Thus, in accordance with the present invention, mobile device 115 is preferably handed off to the cell site associated frequency F4, thereby distributing the cellular traffic in a more efficient way, yet still providing adequate service to the mobile device. Those skilled in the art will appreciate that a cellular network's "frequency plan" provides the mapping between frequencies and cell sites.

Criteria other than current traffic or load may also be used in determining which cell site might be the more desirable cell site to which to direct a handoff. For example, an analysis of a cellular network might indicate that certain cell sites experience high or low traffic at certain periods of time, e.g., during a rush hour period. Thus, in another embodiment of the present invention the table of FIG. 4 preferably also includes a column for "known load pattern." This column is preferably used to identify periods of time during which the level of traffic or the load is known. FIG. 4 depicts a "low" traffic period between 5:00 and 6:30 for frequency F1 and a "high" traffic period between 5:00 and 6:30. Thus, assuming mobile device required a handoff immediately before 5:00, MSC 120 preferably assigns the cell site associated with frequency F1 to receive the handoff since that cell site will soon enter a period of low traffic, whereas the cell site associated with frequency F4, though presently handling a "low" traffic load, will soon enter a period of "high" traffic.

Also, it is sometimes possible to predict the likely path or route of a mobile device when, for example, the mobile device is following an interstate highway. By predicting which cell site is likely to be the next handoff cell site, it is possible to add yet another criterion for selecting which cell site should be selected for handoff. A path or route of the mobile device can be predicted by, for example, analyzing the cell sites that have most recently been used by the mobile device and/or by employing global position satellite (GPS) data that can be returned to the MSC from the mobile device.

Thus, in accordance with the present invention it is possible to select a cell site to handoff to not only based on the criteria of highest signal strength, but also based on various other pertinent criteria including current traffic or load or anticipated traffic or load at particular periods of time. By selecting handoff cell sites in accordance with the present invention it is possible to more efficiently utilize cellular network resources thereby improving service to network customers.

The principles of the present invention are preferably implemented within the MSC and can be implemented in hardware, software of a combination thereof.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of effecting a handoff in a cellular network, comprising:

monitoring a set of frequencies listed in a mobile assisted handoff (MAHO) list for their respective signal strengths;

logically ordering the frequencies based on their relative signal strengths;

identifying in the logically ordered set of frequencies those frequencies having a signal strength higher than a predetermined threshold;

associating a cellular site with at least each frequency in the set of frequencies that has a signal strength higher than the predetermined threshold;

determining a level of traffic at each cellular site identified in the associating; and selecting a cellular site for handoff based at least in part on signal strength and in part on the level of traffic;

wherein determining the level of traffic at each cellular site includes accessing stored known load patterns for each cellular site, the stored known load patterns associating a level of traffic with a time period for each cellular site such that selecting a cellular site for handoff is based in part on expected load at each cellular site.

2. The method of claim 1, wherein the MAHO list is generated by a mobile switching center (MSC).

3. The method of claim 1, wherein the predetermined threshold is a signal strength above which a communications link between a mobile device and a cellular site can be readily maintained.

4. The method of claim 1, wherein the identifying comprises representing the level of traffic with labels.

5. The method of claim 1, wherein the determining comprises representing the level of traffic with numerical values.

6. The method of claim 1, wherein the selecting comprises determining which frequency of the frequencies having a signal strength higher than the predetermined threshold has the lowest level of traffic.

7. The method of claim 1, further comprising selecting the cellular site based in part on a projected route of a mobile device.

8. The method of claim 1, further comprising receiving the signal strengths from a mobile device.

9. The method of claim 1, wherein steps are implemented at least in part with software.

10. The method of claim 1 wherein the logically ordering the frequencies includes ordering all frequencies from highest to lowest signal strength.

* * * * *